No. 655,136. Patented July 31, 1900.
T. F. VANDEGRIFT.
SHAFT COUPLING.
(Application filed Apr. 21, 1900.)
(No Model.)
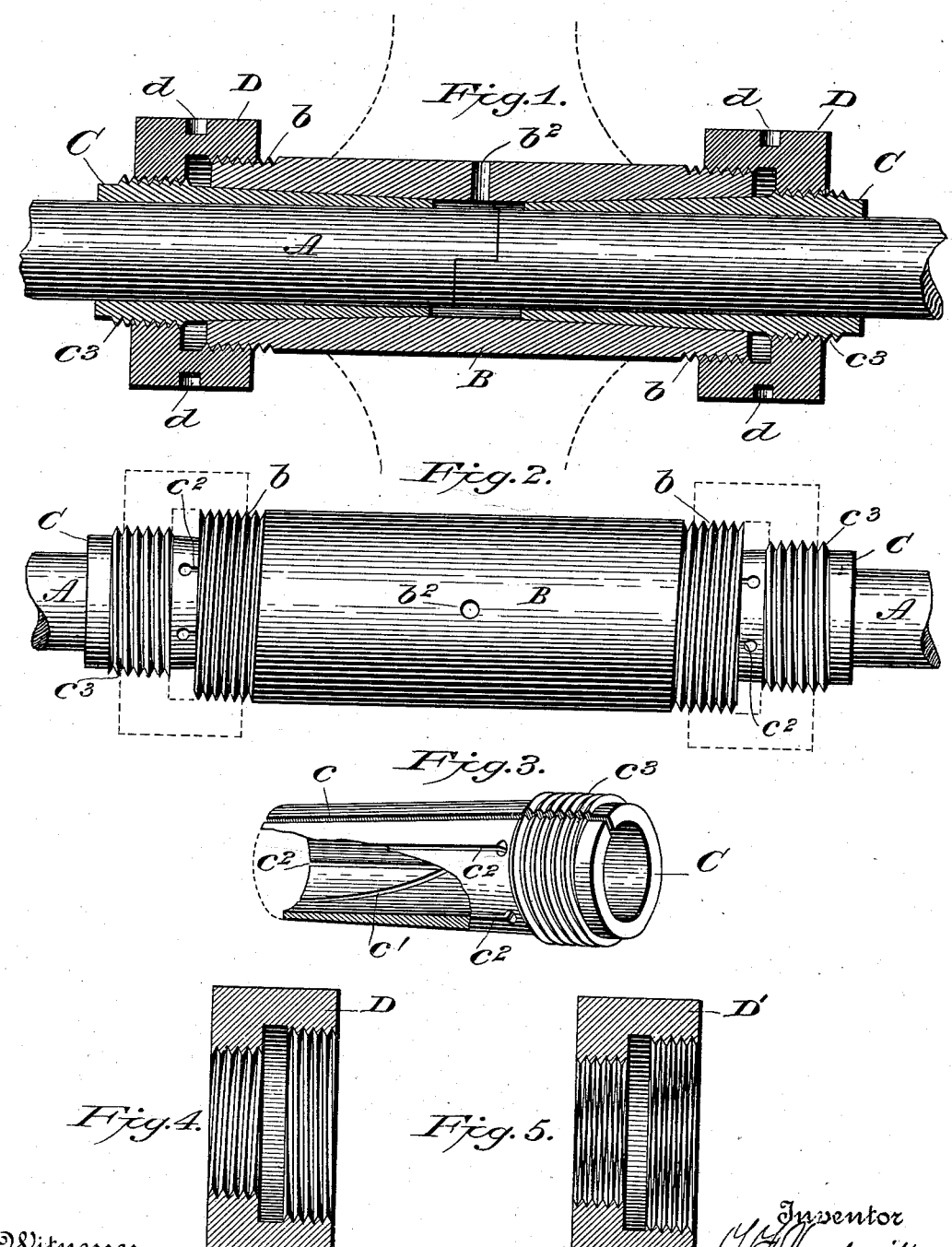

UNITED STATES PATENT OFFICE.

THEODORE F. VANDEGRIFT, OF SHELBYVILLE, INDIANA, ASSIGNOR OF ONE-HALF TO HIRAM J. ROOT, OF SAME PLACE.

SHAFT-COUPLING.

SPECIFICATION forming part of Letters Patent No. 655,136, dated July 31, 1900.

Application filed April 21, 1900. Serial No. 13,702. (No model.)

*To all whom it may concern:*

Be it known that I, THEODORE F. VANDEGRIFT, a citizen of the United States, residing at Shelbyville, in the county of Shelby and State of Indiana, have invented new and useful Improvements in Shaft-Couplings, of which the following is a specification.

This invention appertains to improvements in shaft-couplings, the object being to provide means for connecting abutting ends of shafts, so that a part of the connecting means may serve as a drum or pulley, the coupling being of such construction that it cannot become loosened when the shaft or coupling is turned in either direction.

The invention consists in the combination, with a driving or driven shaft, of a collar or hub with correspondingly-threaded ends and a tapered interior, bushings which embrace the shaft and engage the tapered interior of the collar, the bushings having threaded portions, the angles of the threads opposing the adjacent threads on the collar, nuts with threads of the same pitch, but at opposing angles, for engagement with the collar, and bushings, so that bushings and nuts of like construction may be used and when applied the parts cannot be loosened by turning the shaft or hub.

In the accompanying drawings, Figure 1 is a longitudinal sectional view of a shaft-coupling constructed in accord with my invention. Fig. 2 is a side elevation, the nuts being shown in dotted lines. Fig. 3 is a perspective view of one of the bushings, the same being broken away to show the interior construction. Fig. 4 is a sectional view of one of the nuts as ordinarily used; and Fig. 5 is a sectional view of a modified form of nut for use when either the collar at one end or one of the bushings is threaded otherwise than is shown in Fig. 2, particularly as to the angle of the threads.

In the accompanying drawings, A refers to a shaft with interlocking ends, the other parts shown comprising means for coupling the shaft and attaching thereto a hub, pulley, or gear-wheel in such a manner that when the shaft or the hub is turned in either direction to drive either the shaft or the pulley the connecting means cannot be loosened by the application of power to one part and a resistance to the other part.

The part B may be either a collar, hub, pulley, or gear-wheel, and the ends have threads $b$, which are of the same angle. The part B is tapered interiorly and has near its center an aperture $b^2$. Bushings C C, which are like in construction, are adapted to embrace the shaft A when the tapered portions thereof are compressed by being forced together by engagement with the part B. These bushings are divided longitudinally by a cut $c$ and are also provided with slits $c^2$ and interiorly with a groove or recess $c'$. They also have threaded portions $c^3$, which threads are cut at an opposing angle to the threads $b$ of the part B. It will be noted that the threads are of the same gage though of different angles, and by "different angles" I mean that one set of threads is cut to the right and the other to the left.

D refers to nuts having openings of different diameters, one of the openings having right-hand threads, while the other opening is provided with left-hand threads. Recesses $d$ are provided, so that a spanner or suitably-constructed wrench may be used for turning the same. It will be noted that the ends of the bushings project considerably beyond the threaded portions, sufficiently to be engaged by a tool or driven without liability of injuring the threads.

In some instances it may be desired to use bushings which are not similar in construction as to the angle of the threads thereon, and in such case the threads on one of the ends of the part B will be of a different pitch or angle from the thread on the other end, and in such case the nut D' (shown in Fig. 5) can be used at either end of the coupling.

In applying my invention the bushings, with the nuts in engagement with the threaded portions thereof, are placed upon the adjacent ends of a shaft. The collar is then placed over the shaft, the ends of which are brought into juxtaposition. Then by holding the nut and turning the collar one end will be made secure and the bushing clamped upon the shaft. The other end is operated upon similarly, thus holding the ends of the shafts together and the hub or part B in place, so that when the shaft is turned the entire coupling will turn therewith. It will be noted that when a resistance is applied to the collar or part B there is no tendency to loosen the coupling, for it will draw the bushings in at one end if there is a tendency to force the other end away from the joined ends of the shaft, for where there is a tendency of one part to unscrew the other end tightens in the same ratio. Therefore the coupling will remain set as placed on the shaft. In case it is found difficult to remove the coupling oil may be poured into the space between the collar and shaft through the opening $b^2$ and a wick inserted, and when the wick is ignited it will heat the part B and expand the same, so that the unloosening of the coupling by suitable wrenches may be effected.

I am aware that it has been proposed to provide a shaft-coupling with a hub having at its ends right and left hand threads for use in connection with split taper-sleeves having threads at the same angle as the adjacent threads on the hub, nuts being provided, the threads of the coupling being of the same angle, though of a different gage. With such construction the split sleeves or bushings are not interchangeable, and differently-cut nuts have to be provided. Further, by turning the hub and holding the shaft the nuts and bushings may be separated and the parts disconnected.

Having thus described my invention, what I claim as new, and desire to secure by Letters Patent, is—

1. In a shaft-coupling, a pair of compressible bushings of like construction both having threads of the same angle, a collar or hub which receives the bushings both ends thereof having threads of the same gage and angle which threads oppose the threads on the bushings, whereby the threads at either end of the coupling are right and left handed, and nuts with right and left hand threads, substantially as shown and for the purpose set forth.

2. In a shaft-coupling, the combination with a pair of compressible bushings both of like construction, a collar or hub which is tapered interiorly and provided at its ends with threads, the threads being at the same angle at both ends of said hub, the bushings being provided with threads which oppose the threads on the ends of the hub, whereby the threads at either end of the coupling are right and left handed, and nuts with right and left hand threads whereby the bushings and nuts may be used on either end of the hub, substantially as shown and for the purpose set forth.

3. In a shaft-coupling, a hub the ends having similar threads, compressible bushings with threads the angle thereof opposing the threads on the hub, and nuts with apertures of different diameters threaded to present right and left hand threads, substantially as shown and for the purpose set forth.

In testimony whereof I have hereunto set my hand in presence of two subscribing witnesses.

THEODORE F. VANDEGRIFT.

Witnesses:
CATHERINE VON WEAVER,
WOODVILLE B. KIRK.